(12) United States Patent
Hanssen (10) Patent No.: US 7,879,933 B2
(45) Date of Patent: Feb. 1, 2011

(54) BLENDED NUCLEATING AGENT COMPOSITIONS AND METHODS

(75) Inventor: Rob Hanssen, Sint Lievenslaan (BE)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 12/250,844

(22) Filed: Oct. 14, 2008

(65) Prior Publication Data

US 2009/0054598 A1   Feb. 26, 2009

Related U.S. Application Data (63) Continuation of application No. 11/078,003, filed on Mar. 11, 2005, now abandoned.

(60) Provisional application No. 60/618,326, filed on Oct. 13, 2004.

(51) Int. Cl.
*C08K 5/527* (2006.01)
*C08K 5/098* (2006.01)

(52) U.S. Cl. .................. 524/117; 524/394; 524/396

(58) Field of Classification Search ............... 524/127, 524/394, 396, 117
See application file for complete search history.

(56) References Cited

U.S. PATENT DOCUMENTS

| | | | |
|---|---|---|---|
| 4,463,113 A | 7/1984 | Nakahara et al. | |
| 5,342,868 A | 8/1994 | Kimura et al. | |
| 6,465,551 B1 | 10/2002 | Zhao et al. | |
| 6,521,685 B1 | 2/2003 | Zhao | |
| 6,555,696 B2 | 4/2003 | Doton et al. | |
| 6,559,211 B2 | 5/2003 | Zhao et al. | |
| 6,582,503 B2 | 6/2003 | Dotson et al. | |
| 6,583,206 B2 | 6/2003 | Zhao | |
| 6,585,819 B2 | 7/2003 | Zhao | |
| 6,586,007 B2 | 7/2003 | Lake, Jr. et al. | |
| 6,794,033 B2 | 9/2004 | Morin et al. | |
| 2003/0236332 A1 | 12/2003 | Dotson et al. | |
| 2007/0093605 A1 | 4/2007 | Adur | |

FOREIGN PATENT DOCUMENTS

EP    0 622 404 A1   11/1994
WO   WO 99/24503 A1   5/1999

*Primary Examiner*—Peter Szekely
(74) *Attorney, Agent, or Firm*—Robert M. Lanning (57) ABSTRACT

Certain thermoplastic additives that induce simultaneous good material properties and high nucleation efficacy are provided. Such additives include combinations of a phosphate salt and a dicarboxylate salt. This combination or blend may be provided in various ratios. A method for applying such a combination in a thermoplastic formulation is also disclosed. A thermoplastic formulation, which may or may not include polypropylene, is also disclosed in connection with the combination.

22 Claims, 4 Drawing Sheets

BLENDED NUCLEATING AGENT COMPOSITIONS AND METHODS

CROSS REFERENCE TO RELATED APPLICATIONS

This application is a continuation of, and claims the benefit of the filing date of U.S. patent application Ser. No. 11/078,003, filed on Mar. 11, 2005, now abandoned, which application claims priority to and the benefit of the filing date of U.S. Provisional Patent Application No. 60/618,326 filed Oct. 13, 2004, each of which is hereby incorporated by reference.

BACKGROUND OF THE INVENTION

Nucleating and clarifying agents are chemical compositions that may be added to thermoplastic polymers to facilitate formation of the polymer as it changes from molten to solid form in the process of crystallization. Such additives may assist in reducing haze of polymeric structures. Many different chemical compositions are known for this purpose. One major issue in the use of such agents is the amount or degree of clarity that the agent or additive imparts to a finished polymeric article. Reducing haze and thereby increasing clarity of such articles is a constant endeavor in the plastics industry.

In general, the use of nucleating agents is a highly unpredictable technology area. Small or slight changes in a molecular structure can drastically change the ability of a given nucleating composition to nucleate or clarify effectively a polymer composition. There is a large amount of unpredictability in the art of nucleating agents. There are many unknowns regarding the effect of a given substance on polymer morphology during recrystallization of thermoplastics.

As an example of one type of nucleator, dibenzylidene sorbitol (DBS) compounds are common nucleator compounds, particularly for polypropylene end products. Compounds such as 1,3-O-2,4-bis(3,4-dimethylbenzylidene) sorbitol (hereinafter DMDBS), available from Milliken and Company of Spartanburg, S.C., USA under the trade name Millad 3988®, provide excellent nucleation characteristics for target polypropylenes and other polyolefins. For example, of great interest is the compatibility of such compounds with different additives widely used within typical polyolefin (e.g., polypropylene, polyethylene, and the like) plastic articles.

Calcium stearate is a very popular acid neutralizer present within typical polypropylene formulations to protect the end product from catalyst residue attack. Unfortunately, many nucleator compounds exhibit undesirable reactions with such compounds within polyolefin articles. For sodium, and other metal ions, it appears that the calcium ion from the stearate transfers positions with the sodium ions of the nucleating agents, rendering the nucleating agents ineffective for their intended function. As a result, such compounds sometimes exhibit unwanted plate-out characteristics and overall reduced nucleation performance (as measured, for example) by a decrease in crystallization temperature during and after polyolefin processing.

Problems that may be encountered with the standard nucleators noted above include inconsistent nucleation due to dispersion problems, resulting in stiffness and impact variation in the polyolefin article. Substantial uniformity in polyolefin production is highly desirable because it results in relatively uniform finished polyolefin articles. If the resultant article does not contain a well-dispersed nucleating agent, the entire article itself may suffer from a lack of rigidity and low impact strength.

Furthermore, storage stability of nucleator compounds and compositions is another potential problem with thermoplastic nucleators. Nucleator compounds are generally provided in powder or granular form to the polyolefin manufacturer. Since uniform small particles of nucleating agent may be imperative to provide the requisite uniform dispersion and performance, such compounds must remain as small particles through storage. Certain nucleators, such as sodium benzoate, exhibit relatively high degrees of hygroscopicity such that the powders made therefrom hydrate easily resulting in particulate agglomeration. Such agglomerated particles may require further milling or other processing for de-agglomeration in order to achieve the desired uniform dispersion within the target thermoplastic. Furthermore, such unwanted agglomeration due to hydration may also cause feeding or handling problems for the user.

Solid bicyclo[2.2.1]heptane dicarboxylate salt-containing thermoplastic nucleating additive formulations are used and sold in the industry. Milliken and Company of Spartanburg, S.C. distributes commercially nucleating agents of such metal salts, under the trade name HYPERFORM®. One such product is known commercially as HPN-68®, which is sold by Milliken and Company. U.S. Pat. Nos. 6,465,551; 6,559,211; 6,521,685; and 6,583,206 relate to such compounds and their use. The dicarboxylate salt is usually provided as a granular formulation, and is known as a very good nucleating agent, particularly for applications that require high crystallization temperatures (Tc).

Also of interest is the compatibility of such compounds with different additives widely used within typical polyolefin (e.g., polypropylene, polyethylene, ethylene copolymer polypropylene, (and the like) plastic articles. As noted previously, calcium stearate compatibility is particularly important. Unfortunately, many nucleators exhibit much deleterious nucleating efficacy with such compounds within polyolefin articles. In order to avoid combinations of these standard nucleators and calcium salts, other nonionic acid neutralizers, such as dihydrotalcite (DHT4-A®), sometimes are necessary for use in conjunction with such nucleators.

Other known compounds useful for nucleation include sodium 2,2'-methylene-bis-(4,6-di-tert-butylphenyl) phosphate (from Asahi Denka Kogyo K.K., known commercially as NA-11®), talc, and the like. Such compounds all impart high polyolefin crystallization temperatures; however, each also exhibits its own drawback for large-scale industrial applications. U.S. Pat. Nos. 4,463,113 and 5,342,868 disclose crystalline synthetic resin compositions of cyclic organophosphoric esters.

The structure that is believed to be used in connection with NA-11® is shown below:

A nucleating agent for polypropylene with a combination of positive material properties, like high Tc, low $t_{1/2}$, isotropic shrinkage, and high stiffness would be highly desirable. Phosphate ester salts, like NA-11® and NA-21® (manufactured by Asahi Denka Kogyo Kabushiki Kaisha of Japan) are known to incur relatively high stiffness in injection molded articles. However, warpage caused by anisotropic shrinkage is often an undesired side effect of such materials. Such warpage is a disadvantage of using phosphate ester salts, and causes them to be undesirable in many applications.

Thus, it may be seen that each nucleating composition has its advantages and disadvantages. This has created a long-felt need in the polyolefin nucleator compound industry to provide compositions that minimize such problems and provide excellent peak crystallization temperatures for the target polyolefin. Unfortunately, it is a significant challenge to find nucleators exhibiting exceptionally high peak crystallization temperatures, low hygroscopicity, excellent thermal stability, high stiffness, and relatively low amounts of shrinkage or warpage in finished articles. For example, many nucleators cause shrinkage beyond the limits required to keep molded articles within their size specifications. Shrinkage is a significant problem in the industry. The invention disclosed herein is directed at minimizing such problems.

Blends of more than one nucleator have been tried, but are not always successful. Furthermore, this is a highly unpredictable area of the chemical arts, and there is usually no any way of knowing what will work until it is tried, and tested, and a relatively substantial amount of work is done.

U.S. Pat. No. 6,586,007 is directed to a combination of 3,4-dimethylbenzylidene sorbitol (DBS) and p-methylbenzylidene sorbitol (mDBS). U.S. Pat. Nos. 6,521,685 and 6,585,819 are directed to additives that comprise a blend of (a) bicyclic salts, and (b) benzylidene sorbitol acetals.

BRIEF DESCRIPTION OF THE DRAWINGS

A full and enabling disclosure of this invention, including the best mode shown to one of ordinary skill in the art, is set forth in this specification. The following Figures illustrate the invention.

DETAILED DESCRIPTION OF THE INVENTION

Reference now will be made to the embodiments of the invention, one or more examples of which are set forth below. Each example is provided by way of explanation of the invention, not as a limitation of the invention. In fact, it will be apparent to those skilled in the art that various modifications and variations can be made in this invention without departing from the scope or spirit of the invention.

An object of the invention is to provide a thermoplastic additive composition that simultaneously induces high levels of nucleation efficiency as well as low degrees of haze (and thus excellent clarity) within target thermoplastic articles. Additionally, the invention provides a nucleator/clarifier additive composition that may be used in various polyolefin media for use in many end uses.

Accordingly, this invention is directed to a nucleating or clarifying agent composition that is a combination of a phosphate salt and a dicarboxylate salt. This combination or blend may be provided in various ratios. The invention also includes a method for applying such a combination in a thermoplastic formulation, and also the formulation containing the combination.

In general, it is widely known that a combination of two different types of nucleating agents in one plastic or thermoplastic leads to the result that one of the nucleators overrides essentially all the effects of the other nucleating agent. This is a common and widely understood principle in the art of nucleation.

However, in the practice of the invention, surprisingly, it has been discovered that the addition of two specific types of nucleating agents (set forth herein) will change only one of the properties (stiffness). This is the case, even though the crystallization temperatures and crystallization half times of the resulting nucleated polymers are barely affected.

It would be expected that the combination of: (a) a phosphate salt nucleating agent, and (2) a dicarboxylate salt nucleating agent, (3) when combined in a single plastic or thermoplastic formulation: would not have had any significant effects upon the crystallization temperature or stiffness. However, this unexpectedly discovered highly desirable combination provides, in certain circumstances, a crystallization temperature (Tc) that is substantially higher than the Tc's of both the named single nucleators when used alone. Furthermore, the stiffness of the nucleator combination is higher or equal to the stiffness of using each alone. These are surprisingly and beneficial results, which are novel and nonobvious over known prior art nucleating agent compositions. Further, these results and these particular blends are unknown in the industry.

As used herein, the term "thermoplastic" refers generally to a polymeric material that will melt upon exposure to sufficient heat but will retain its solidified state upon cooling. "Thermoplastic" refers to plastics having crystalline or semi-crystalline morphology upon cooling after melt-formation, usually by the use of a mold or like article. Particular types of polymers contemplated within such a definition include, without limitation, polyolefins (such as polyethylene, polypropylene, polybutylene, and any combination thereof), polyamides (such as nylon), polyurethanes, polyester (such as polyethylene terephthalate), and the like (as well as any combinations thereof).

Thermoplastics have been utilized in a variety of end-use applications, including storage containers, medical devices, food packages, plastic tubes and pipes, shelving units, and the like. Such base compositions, however, must exhibit certain physical characteristics in order to permit widespread use. Specifically within polyolefins, for example, uniformity in arrangement of crystals upon crystallization is a necessity to provide an effective, durable, and versatile polyolefin article. In order to achieve such desirable physical properties, it has been known that certain compounds and compositions provide nucleation sites for polyolefin crystal growth during molding or fabrication. Generally, compositions containing such nucleating compounds crystallize at a much faster rate than un-nucleated polyolefin. Such crystallization at higher temperatures results in reduced fabrication cycle times and a variety of improvements in physical properties, such as stiffness.

Such compounds and compositions that provide faster and or higher polymer crystallization temperatures are popularly known as nucleators. Such compounds provide nucleation sites for crystal growth during cooling of a thermoplastic molten formulation.

In one embodiment of the invention, the combination comprises both a multi-cyclic phosphate salt and a metal or organic salts of saturated bicyclic dicarboxylates.

Such a method includes the steps of (a) providing a molten thermoplastic formulation; (b) introducing to such formulation and mixing therein a composition comprising at least one phosphate-containing salt and at least one dicarboxylate-containing salt, and (c) allowing the resultant composition of step "b" to cool into a thermoplastic article.

Salts of Dicarboxylates

Some particular, non-limiting examples of such novel nucleator compounds include the metal or organic salts of saturated [2.2.1] bicyclic dicarboxylates, and most preferably of these types of compounds conforming to Formula (I)

Formula (I):

wherein $M_1$ and $M_2$ are the same or different, or $M_1$ and $M_2$ are combined to from a single moiety, and are independently selected from the group consisting of metal or organic cations, and $R_1$, $R_2$, $R_3$, $R_4$, $R_5$, $R_6$, $R_7$, $R_8$, $R_9$, and $R_{10}$ are individually selected from the group consisting of hydrogen, $C_1$-$C_9$ alkyl, hydroxyl, $C_1$-$C_9$ alkoxy, $C_1$-$C_9$ alkyleneoxy, amine, and $C_1$-$C_9$ alkylamine, halogen, phenyl, alkylphenyl, and geminal or vicinal $C_1$-$C_9$ carbocyclic.

The metal cations are selected from the group consisting of calcium, strontium, barium, magnesium, aluminum, silver, sodium, lithium, rubidium, potassium, and the like. Within that scope, group I and group II metal ions are generally quite effective. Among the group I and II cations, sodium, potassium, calcium and strontium are useful, wherein sodium and calcium are very useful. Furthermore, the $M_1$ and $M_2$ groups may also be combined to form a single metal cation (such as calcium, strontium, barium, magnesium, aluminum, and the like). Although this invention encompasses all stereochemical configurations of such compounds, the cis configuration is preferred wherein cis-endo is one of the most preferred embodiments. The preferred embodiment polyolefin articles and additive compositions for polyolefin formulations comprising at least one of such compounds are also encompassed within this invention.

A blended nucleating or clarifying composition for thermoplastics is employed, comprising a blend of a first nucleating agent of a carboxylic acid salt compound and a second nucleating agent of a Bis-phenol phosphate. The first nucleating agent is selected from the group conforming with the structure of Formula (I)

(I)

wherein $M_1$ and $M_2$ are the same or different, or $M_1$ and $M_2$ are combined to from a single moiety, and are independently selected from the group consisting of metal or organic cations, and $R_1$, $R_2$, $R_3$, $R_4$, $R_5$, $R_6$, $R_7$, $R_8$, $R_9$, and $R_{10}$ are individually selected from the group consisting of hydrogen, $C_1$-$C_8$ alkyl, hydroxyl, $C_1$-$C_9$ alkoxy, $C_1$-$C_9$ alkyleneoxy, amine, and $C_1$-$C_8$ alkylamine, halogen, phenyl, alkylphenyl, and $C_1$-$C_9$ carbocyclic.

Cyclic Phosphates

In some instances, the Bis-phenol phosphates comprise the formula:

wherein: R is selected from the group consisting of: a carbon-to-carbon bond; thio sulfur —S—; and alkylidene in which $R_3$ and $R_4$ are selected from the group consisting of hydrogen, alkyl having from one to about eighteen carbon atoms, and cycloalkyl, including cycloalkylidene in which $R_3$ and $R_4$ are taken together as part of a cycloalkylene ring, having from three to about twelve carbon atoms; and in which $R_1$ and $R_2$ each are selected from the group consisting of: hydrogen, alkyl having from about one to about eighteen carbon atoms; and cycloalkyl having from about 3-12 carbon atoms. Typically, M is a metal atom selected from alkali metal atoms or alkaline earth metal atoms; and n is the valence of the metal atom M, and ranges from 1 to 2.

R is alkylidene and $R_1$ and $R_2$ may be alkyl. In some embodiments, R is thio sulfur —S—and $R_1$ and $R_2$ are each alkyl. For some applications, R is a carbon-to-carbon bond and $R_1$ and $R_2$ are each alkyl. R may be cycloalkylidene and $R_1$ and $R_2$ may be each alkyl.

In yet other applications, $R_1$ and $R_2$ may be t-alkyl, and R may comprise alkylidene. R may be provided as a carbon-to-carbon bond. Bis-phenol phosphates may be employed in which R is thio sulfur —S—. $R_3$ and $R_4$ may be each hydrogen as well. Furthermore, $R_3$ may be hydrogen and $R_4$ may be alkyl. $R_3$ may be hydrogen and $R_4$ may be cycloalkyl. Alternatively, $R_3$ and $R_4$ may be taken together as cycloalkylidene. Bis-phenol phosphates may be provided in which M is an alkali metal. M may be an alkaline earth metal. M may be a polyvalent metal. $R_1$ and $R_2$ may be each tertiary alkyl.

$R_1$ may be hydrogen and $R_2$ may be tertiary alkyl.

$R_1$ may be hydrogen and $R_2$ may be cycloalkyl.

Exemplary R alkylidene include at least the following, but are not limited to the following: methylidene, ethylidene, propylidene, isopropylidene, butylidene, isobutylidene, sec-butylidene, tert-butylidene, amylidene, hexylidene, heptylidene, octylidene, isooctylidene, 2-ethyl hexylidene, non-ylidene and decylidene; cyclohexylidene, cycloheptylidene, methyl cyclohexylidene, ethyl cyclohexylidene, and cyclooctylidene.

Exemplary $R_1$ and $R_2$, $R_3$ and $R_4$ alkyl include methyl, ethyl, propyl, isopropyl, n-butyl, isobutyl, sec-butyl, t-butyl, amyl, t-amyl, hexyl, heptyl, octyl, 2-ethylhexyl, t-octyl, nonyl, decyl, undecyl, dodecyl, tridecyl, tetradecyl, pentadecyl, hexadecyl, heptadecyl and octadecyl.

Exemplary $R_1$ and $R_2$, $R_3$ and $R_4$ cycloalkyl include cyclopropyl, cyclobutyl, cyclopentyl, methylcyclopentyl, cyclohexyl, methylcyclohexyl, cycloheptyl, cyclooctyl and cyclododecyl.

Exemplary M monovalent metals include Li, Na, Ki; exemplary bivalent metals include Be, Ca, Sr, Ba, Zn, and Cd; Exemplary trivalent and tetravalent metals include Al, Ge, Sn, Pb, Ti, Zr, Sb, Cr, Bi, Mo, Mn, Fe, Co and Ni. Among these metals, the alkali metals such as Li, Na and K and the alkaline earth metals such as Mg, Ca, Sr and Ba are known to be useful.

Compounds useful for nucleation in the combination of the invention include, but are not limited to, sodium 2,2'-methylene-bis-(4,6-di-tert-butylphenyl) phosphate (from Asahi Denka Kogyo K.K., known commercially as NA-11®), talc, and the like. The invention may employ essentially any cyclic group having a phosphate attached. Bicyclic, tricyclic, and the like may be employed, with a phosphate salt, as one example.

In one embodiment, the combination of the invention comprises both a multi-cyclic phosphate salt and organic salts of saturated bicyclic dicarboxylates.

As indicated, the structure of NA-11® is one example of a phosphate-containing nucleator that may be employed. Its structure is shown below:

This invention, in one embodiment, brings a combination of the positive aspects from both phosphate ester salts and Hyperform® HPN-68 (a product of Milliken and Company of Spartanburg, S.C., USA), being:

High crystallization temperatures (substantially equal to Hyperform® HPN-68); Low crystallization half times (substantially equal to Hyperform® HPN-68); Isotropic shrinkage (between control and Hyperform® HPN-68); Shrinkage reduction (between NA-11 and Hyperform® HPN-68); High perceived stiffness (substantially equal to NA-11®).

Although polyolefins are preferred, the nucleating agents of the present invention are not restricted to polyolefins, and may also give beneficial nucleation properties to polyesters such as polyethylene terephthalate (PET), polybutylene terephthalate (PBT), and polyethylene naphthalate (PEN), as well as polyamides such as Nylon 6, Nylon 6,6, and others. Generally, many different types of thermoplastic compositions having some crystalline content may be improved with the nucleating agents of the present invention.

EXAMPLES

A series of nucleators was compounded into homopolymer polypropylene (Basell Pro-fax® 6301NT) together with a standard stabilization package (800 ppm calcium stearate, 1500 ppm Irganox® B215). Plaques (dimensions: 50×70×3 $mm^3$) were injection molded from the resulting compounds. Thermal properties were determined with a Perkin Elmer Diamond DSC. Mechanical properties (flexural modulus) were measured on a Lloyd LR10 tensile tester with a 500 N load cell.

Thermal Properties

The crystallization temperature was determined by heating approximately 2.5 mg sample to 220° C., keeping it at this temperature for 2 minutes to remove any thermal history, and cooling down to 50° C. at a cooling rate of 20° C./min. The peak of the crystallization exotherm is regarded as the crystallization temperature.

The crystallization half time was determined by heating approximately 5.0 mg sample to 220° C., keeping it at this temperature for 2 minutes to remove any thermal history, and cooling down to 135° C. at a cooling rate of 200° C./min. The time after which half of the sample had crystallized is regarded as the crystallization half time.

Figure 1:
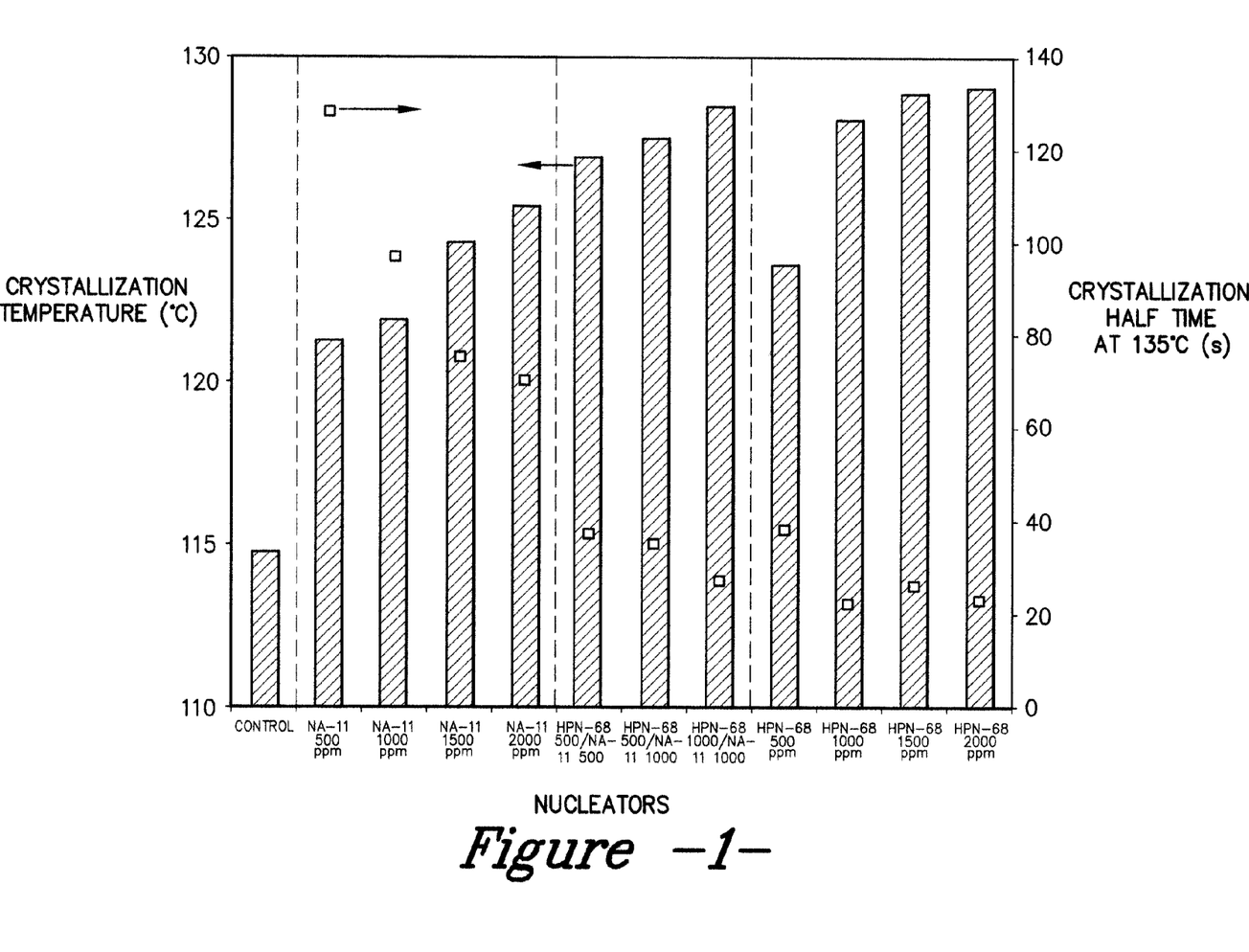
FIG. 1 shows a comparison of crystallization temperature and crystallization temperature half-time of homopolymer polypropylene nucleated by (1) Hyperform HPN-68® alone (2) NA-11UF® alone, as compared to the inventive blends of (3) Hyperform® HPN-68® with NA-11®.

FIG. 1 shows the thermal properties measurements as a function of nucleator content. Values are provided in Table 1 below.

The results in FIG. 1 show that Hyperform® HPN-68 nucleated polypropylene samples at concentrations over 500 ppm of nucleator have higher crystallization temperatures than any of the NA-11® nucleated polymers. Blends of Hyperform HPN-68® and NA-11® nucleated polymers all have higher crystallization temperatures than the NA-11® nucleated polymers, irrespective of their composition. This is a surprising and unexpected result. The crystallization half times follow the same trends.

Mechanical Properties

The flexural modulus was determined from three-point bending force measurements on injection molded plaques (50×70×3 $mm^3$). Measurements were carried out at 1.28 mm/minute bending speed on a 48 mm support span. The reported values are averages of five measurements after eight days of annealing at room temperature.

Figure 2:
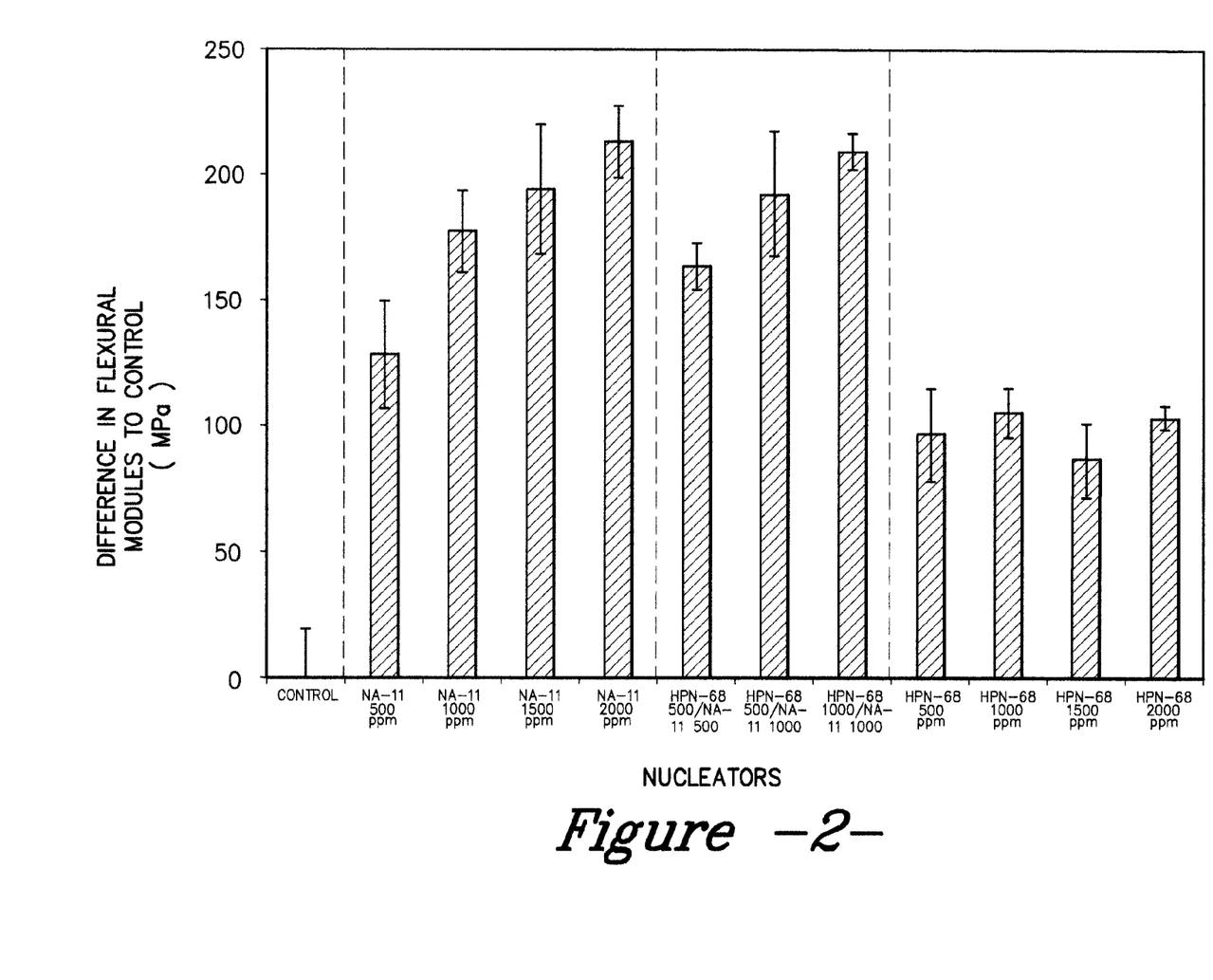
FIG. 2 shows the difference in flexural modulus compared to control.

The results of the flexural modulus measurements are graphically depicted in FIG. 2; values are in Table 2 in the appendix. FIG. 2 shows the difference in flexural modulus compared to control. All nucleated samples have a higher flexural modulus than the control samples. However, it can be easily seen that the values for NA-11® nucleated homopolymer are significantly higher than for the Hyperform HPN- 68® nucleated samples, irrespective of the concentration. Furthermore, there is a significant increase of flexural modulus with the concentration of NA-11®, while there is not for the Hyperform HPN-68® nucleated samples.

Samples in which both Hyperform® HPN-68 and NA-11 are present, have higher flexural moduli than samples with just Hyperform® HPN-68, and equal moduli compared to samples with just NA-11® in concentrations of Hyperform® HPN-68 and NA-11® combined.

Shrinkage and Shrinkage Anisotropy

Shrinkage was determined from injection molded plaques ((50×70×3 mm$^3$) in both machine direction (MD) and transverse direction (TD). Shrinkage anisotropy is as in Formula 1.

$$\text{anisotrophy} = \frac{\text{relative shrinkage in } TD}{\text{relative shrinkage in } MD} - 1$$

Equation 1: Definition of Anisotropy

Relative shrinkage is defined in Formula 2.

$$\text{relative shrinkage} = \frac{L_0 - L}{L_0} * 100\%$$

Equation 2: Definition of Relative Shrinkage

Where $L_0$ is the size of the mold, and L is the size of the plaque 2 days after injection molding.

Figure 3:
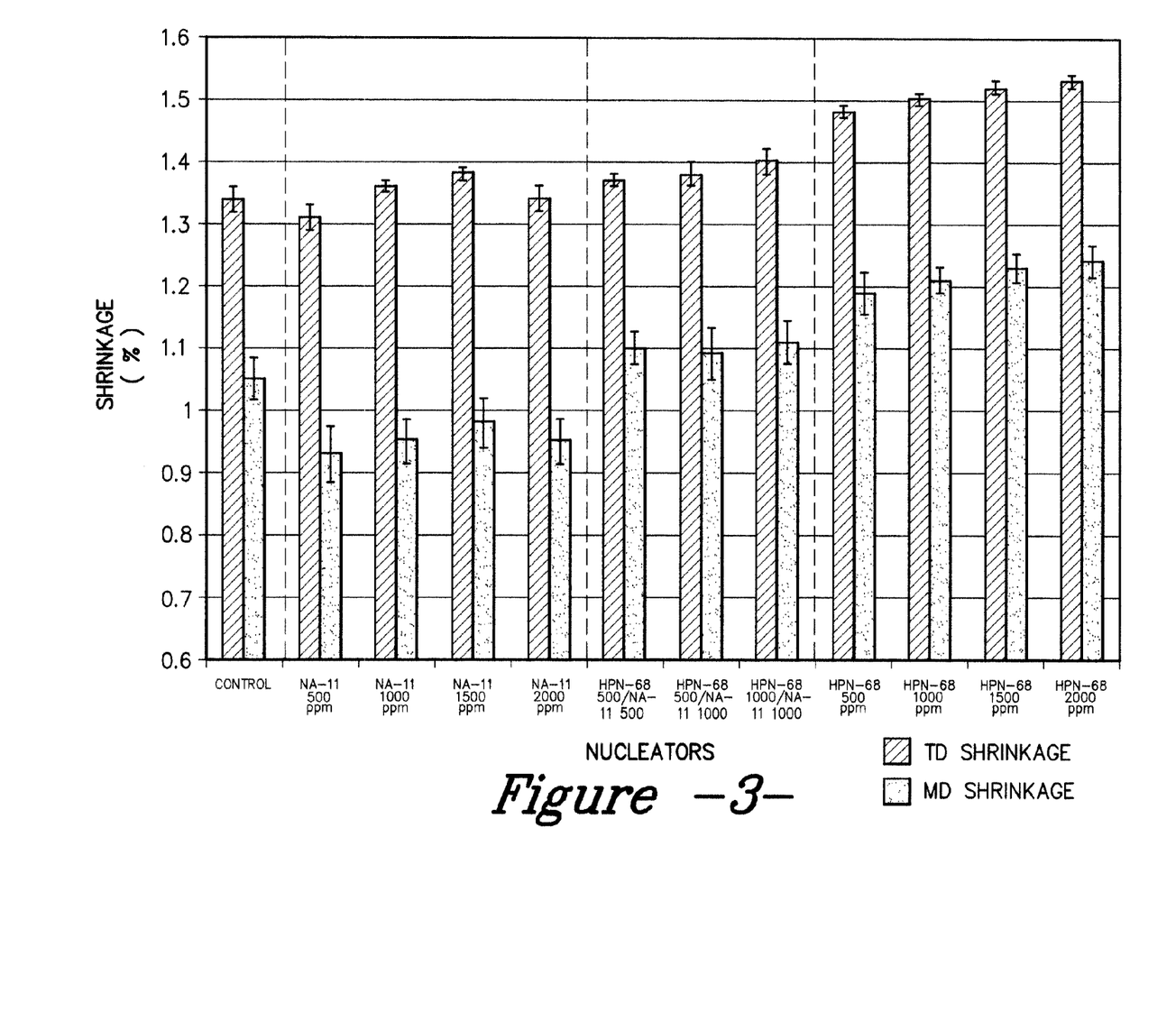
FIG. 3 shows results of shrinkage measurements.
Figure 4:
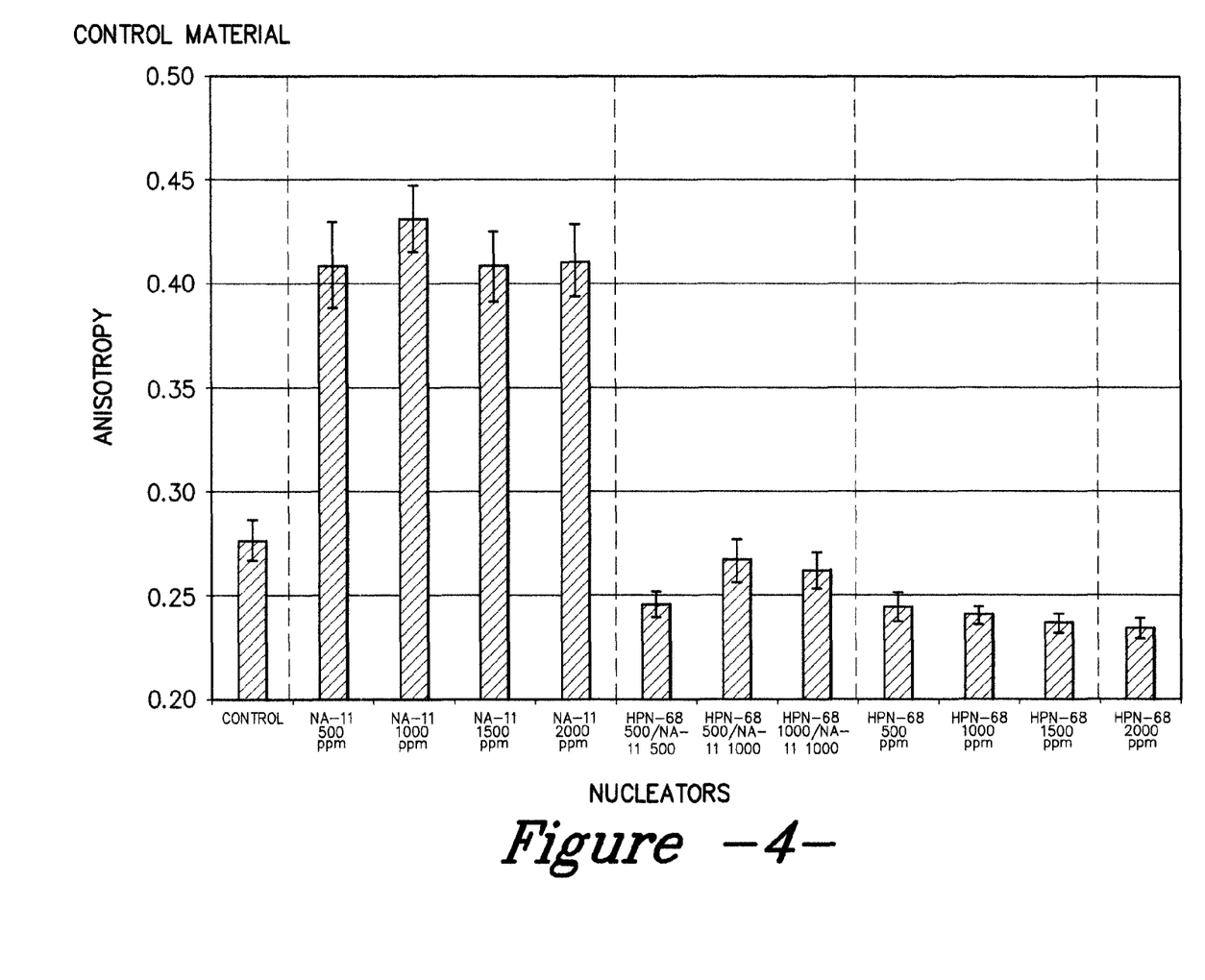
FIG. 4 depicts results of anisotropy calculations.

Results of the shrinkage measurements are shown in FIG. 3; results of the anisotropy calculations are shown in FIG. 4. The values are in Table 3.

Hyperform® HPN-68 nucleated samples show the highest shrinkage in both machine direction (MD) and transverse direction (TD) and shrinkage is slightly dependent on HPN-68 concentration. Shrinkage in the NA-11 nucleated samples is different for TD and MD; in the MD, the shrinkage is lower than control, while in the TD shrinkage is equal to or higher than control. The samples containing both Hyperform® HPN-68 and NA-11® have shrinkages that are equal or slightly higher than control in both directions, but lower than the Hyperform® HPN-68 nucleated samples.

Effects on anisotropy are shown in FIG. 4.

Materials nucleated with only NA-11® have a high tendency for anisotropic shrinkage compared to control materials. This anisotropic shrinkage is not significantly dependent on the concentration of NA-11®. Materials nucleated with Hyperform® HPN-68 have a tendency to shrink more isotropically than control materials. Shrinkage induced by Hyperform® HPN-68 tends to be more isotropic by increasing the concentration of the nucleating agent.

Samples containing both Hyperform® HPN-68 and NA-11® have anisotropy values comparable or slightly higher than samples with just Hyperform HPN-68, and slightly lower or equal compared to control material.

Homopolymer polypropylene nucleated with a mixture of Hyperform® HPN-68 and NA-11® surprisingly and unexpectedly provides several beneficial properties in the polymer. These may include, but are not limited to, the following positive properties: High crystallization temperatures (may be substantially equal to Hyperform® HPN-68); Low crystallization half times (may be substantially equal to Hyperform® HPN-68); Isotropic shrinkage (between control and Hyperform® HPN-68); Shrinkage reduction (between NA-11® and Hyperform® HPN-68); High perceived stiffness (substantially equal to NA-11®).

Sheet extrusion and thermoforming are applications besides injection molding where this blend could be beneficial. The stiffness of NA-11 and isotropic shrinkage of Hyperform® HPN-68 are a highly desirable combination for both applications.

Accordingly, this invention is directed to a nucleating or clarifying agent composition that is a combination of a phosphate salt and a dicarboxylate salt. One example of the phosphate salt is the NA-11®, as shown above. However, many other phosphate salts could be used, and the invention is not limited to any particular phosphate salt. This combination or blend may be provided in various ratios. The invention also includes a method for applying such a combination in a thermoplastic formulation, and also the formulation containing the combination.

In the blends of the invention, synergistic effects are evident. That is: the Tc of combination is higher that Tc's of each component alone, although somewhat lower than hyperform at the total concentration of both:

| | |
|---|---|
| NA-11 ® (500 ppm): | 121.3° C. |
| HPN-68 ® (500 ppm): | 123.6° C. |
| HPN-68 ® + NA-11 (both 500): | 126.9° C. |
| HPN-68 ® (1000 ppm): | 128.1° C. |

The effect of the combination is surprisingly high, and also beneficial for many applications. As to stiffness, it is observed to be about the same as with Tc. That is, the stiffness is higher or equal than both alone, but somewhat lower or equal than NA-11® at the total concentration of both.

| | |
|---|---|
| NA-11 ® (1000 ppm): | 1695 MPa |
| HPN-68 ® (1000 ppm): | 1623 MPa |
| HPN-68 + NA-11 ® (both 1000): | 1727 MPa |
| NA-11 (2000 ppm): | 1731 MPa |

Also, these values should be noted as well, set forth below.

| | |
|---|---|
| NA-11 ® (1000 ppm): | 1695 MPa |
| HPN-68 ® (500 ppm): | 1614 MPa |
| HPN-68 + NA-11 ® (500 + 1000): | 1710 MPa |
| NA-11 (1500 ppm): | 1712 MPa |

Example 1

Hyperform HPN-68:NA-11=500:500

To a mixture of 200 g polypropylene homopolymer fluff was added 5.0 g of Hyperform Concentrate Hi5-5 [Hi5-5 is a 5% concentrate form of Hyperform® HPN-68®, and also is a product of Milliken and Company of Spartanburg, S.C., USA]; 0.25 g of NA-11® (2,2'-methylene-bis(4,6-di-tert-butylphenyl) phosphate sodium) and a standard stabilization package (0.75 g Irganox® B-215 and 0.40 g calcium stearate). To this mixture, enough polypropylene homopolymer fluff was added for the total weight to reach 500 g. The resulting mixture was physically blended with a ribbon blender for at least five minutes.

Example 2

Hyperform® HPN-68:NA-11=100:1000

To a mixture of 200 g polypropylene homopolymer fluff was added 1.0 g of Hyperform® Concentrate Hi5-5, 0.50 g of NA-11® (2,2'-methylene-bis(4,6-di-tert-butylphenyl) phosphate sodium) and a standard stabilization package (0.75 g Irganox® B215 and 0.40 g calcium stearate). To this mixture, enough polypropylene homopolymer fluff was added for the total weight to reach 500.00 g. The resulting mixture was physically blended with a ribbon blender for at least five minutes.

Example 3

Hyperform® HPN-68:NA-11=200:1000

To a mixture of 200 g polypropylene homopolymer fluff was added 2.0 g of Hyperform® Concentrate Hi5-5, 0.50 g of NA-11 (2,2'-methylene-bis(4,6-di-tert-butylphenyl) phosphate sodium) and a standard stabilization package (0.75 g Irganox® B-215 and 0.40 g calcium stearate). To this mixture, enough polypropylene homopolymer fluff was added for the total weight to reach 500 g. The resulting mixture was physically blended with a ribbon blender for at least five minutes.

Example 4

Hyperform® HPN-68:NA-11=500:1000

To a mixture of 200 g polypropylene homopolymer fluff was added 5.0 g of Hyperform® Concentrate Hi5-5, 0.50 g of NA-11® (2,2'-methylene-bis(4,6-di-tert-butylphenyl) phosphate sodium) and a standard stabilization package (0.75 g Irganox® B215 and 0.40 g calcium stearate). To this mixture, enough polypropylene homopolymer fluff was added for the total weight to reach 500 g. The resulting mixture was physically blended with a ribbon blender for at least five minutes.

Example 5

Hyperform® HPN-68: NA-11=750:1000

To a mixture of 200 g polypropylene homopolymer fluff was added 7.5 g of Hyperform® Concentrate Hi5-5, 0.50 g of NA-11 (2,2'-methylene-bis(4,6-di-tert-butylphenyl) phosphate sodium) and a standard stabilization package (0.75 g Irganox® B-215 and 0.40 g calcium stearate). To this mixture, enough polypropylene homopolymer fluff was added for the total weight to reach 500.00 g. The resulting mixture was physically blended with a ribbon blender for at least five minutes.

Example 6

Hyperform® HPN-68:NA-11=1000:1000

To a mixture of 200 g polypropylene homopolymer fluff was added 10.0 g of Hyperform® Concentrate Hi5-5, 0.50 g of NA-11 (2,2'-METHYLENE-BIS(4,6-DI-TERT-BUTYLPHENYL) PHOSPHATE SODIUM) and a standard stabilization package (0-75 g Irganox® B215 and 0.40 g calcium stearate). To this mixture, enough polypropylene homopolymer fluff was added for the total weight to reach 500 g. The resulting mixture was physically blended with a ribbon blender for at least five minutes.

Example 7

Hyperform® HPN-68 500 ppm—Comparative)

To a mixture of 200 g polypropylene homopolymer fluff was added 5.0 g of Hyperform® Concentrate Hi5-5 and a standard stabilization package (0.75 g Irganox® B215 and 0.40 g calcium stearate). To this mixture, enough polypropylene homopolymer fluff was added for the total weight to reach 500.00 g. The resulting mixture was physically blended with a ribbon blender for at least five minutes.

Example 8

Hyperform® HPN-68 1000 ppm—Comparative

To a mixture of 200 g polypropylene homopolymer fluff was added 10.0 g of Hyperform® Concentrate Hi5-5 and a standard stabilization package (0.75 g Irganox® B215 and 0.40 g calcium stearate). To this mixture, enough polypropylene homopolymer fluff was added for the total weight to reach 500.00 g. The resulting mixture was physically blended with a ribbon blender for at least five minutes.

Example 9

NA-11® 1000 ppm—Comparative

To a mixture of 200 g polypropylene homopolymer fluff was added 0.50 g of NA-11® (2,2'-methylene-bis(4,6-di-tert-butylphenyl) phosphate sodium) and a standard stabilization package (0.75 g Irganox® B215 and 0.40 g calcium stearate). To this mixture, enough polypropylene homopolymer fluff was added for the total weight to reach 500.00 g. The resulting mixture was physically blended with a ribbon blender for at least five minutes.

Example 10

Extrusion and Injection Molding

The mixtures obtained in examples 1 to 7 were melt-compounded on a Killion® KLB 100 (L/D ratio 32:1–single screw D=1"). The temperature profile was set at 205° C. (feed)-220° C.-230° C.-230° C. (die) and a screen pack screen pack (40/300/100/60 mesh) was used. Plaques of dimensions 70×50×3 mm$^3$ (length×width×thickness) were injection molded from the melt-compounded blends on an Arburg Allrounder 221-55-250 with 18 mm diameter screw. The temperature profile was set as follows, 200° C. (feed)-215° C.-215° C.-215° C. (nozzle).

Example 11

Physical Testing

Crystallization temperatures were determined with a Perkin Elmer Diamond DSC on small pieces (~2.5 mg) of injection molded plaques. The following temperature profile was used: heating at 20° C./min to 220° C., holding at 220° C. for 2 minutes, cooling at 20° C./min to 50° C. The crystallization temperature TC was determined in the cooling run. Subsequent heating at 20° C. to 220° C. provided the melting temperature. Shrinkage was determined by measuring the injection molded 3 mm plaques 48 hours after injection molding with a caliper. Shrinkage in both machine as well as transverse direction were calculated by the formula shrinkage=$(L_0-L)/L_0*100\%$, in which $L_0$ is the mold dimension and L is the size of the injection molded plaque after 48 hours. Shrinkage anisotropy is determined by the formula anisotropy=(shrinkage TD)/(shrinkage MD)−1. Flexural modulus is determined 7 days after injection molding on 3 mm plaques.

Example 12

Hyperform® HPN-68:NA-11=500:500, Random Copolymer

To a mixture of 200 g polypropylene random copolymer fluff was added 5.0 g of Hyperform® Concentrate Hi5-5, 0.25 g of NA-11 (2,2'-methylene-bis(4,6-di-tert-butylphenyl) phosphate sodium) and a standard stabilization package (0.75 g Irganox® B215 and 0.40 g calcium stearate). To this mixture, enough polypropylene random copolymer fluff was added for the total weight to reach 500.00 g. The resulting mixture was physically blended with a ribbon blender for at least five minutes.

Example 13

Hyperform® HPN-68:NA-11=500:1000, Random Copolymer

To a mixture of 200 g polypropylene random copolymer fluff was added 5.0 g of Hyperform Concentrate Hi5-5, 0.50 g of NA-11 (2,2'-methylene-bis(4,6-di-tert-butylphenyl) phosphate sodium) and a standard stabilization package (0.75 g Irganox B215 and 0.40 g calcium stearate). To this mixture, enough polypropylene random copolymer fluff was added for the total weight to reach 500.00 g. The resulting mixture was physically blended with a ribbon blender for at least five minutes.

Example 14

Hyperform® HPN-68:NA-11=1000:1000, Random Copolymer

To a mixture of 200 g polypropylene random copolymer fluff was added 10.0 g of Hyperform® Concentrate Hi5-5, 0.50 g of NA-11 (2,2'-methylene-bis(4,6-di-tert-butylphenyl) phosphate sodium) and a standard stabilization package (0.75 g Irganox® B215 and 0.40 g calcium stearate). To this mixture, enough polypropylene random copolymer fluff was added for the total weight to reach 500.00 g. The resulting mixture was physically blended with a ribbon blender for at least five minutes.

It is understood by one of ordinary skill in the art that the present discussion is a description of exemplary embodiments only, and is not intended as limiting the broader aspects of the present invention, which broader aspects are embodied in the exemplary constructions. The invention is shown by example in the appended claims.

What is claimed is:

1. A thermoplastic composition consisting essentially of:
   (a) a thermoplastic polymer selected from the group consisting of polyolefins, polyamides, polyesters, and combinations thereof;
   (b) a first nucleating agent selected from the group consisting of compounds conforming to the structure of Formula (I)

wherein $M_1$ and $M_2$ are the same or different, or $M_1$ and $M_2$ are combined to from a single moiety, and are independently selected from the group consisting of metal or organic cations, and $R_1$, $R_2$, $R_3$, $R_4$, $R_5$, $R_6$, $R_7$, $R_8$, $R_9$, and $R_{10}$ are individually selected from the group consisting of hydrogen, $C_1$-$C_9$ alkyl, hydroxyl, $C_1$-$C_9$ alkoxy, $C_1$-$C_9$ alkyleneoxy, amine, and $C_1$-$C_9$ alkylamine, halogen, phenyl, alkylphenyl, and $C_1$-$C_9$ carbocyclic; and (c) a second nucleating agent selected from the group consisting of compounds conforming to the structure of Formula (II)

wherein R is selected from the group consisting of a carbon-to-carbon bond, thio sulfur (—S—), and alkylidene groups conforming to the structure below in which $R_3$ and $R_4$ are selected from the group consisting of hydrogen, alkyl having from one to about eighteen carbon atoms, and cycloalkyl, including cycloalkylidene in which $R_3$ and $R_4$ are taken together as part of a cycloalkylene ring having from three to about twelve carbon atoms;

wherein $R_1$ and $R_2$ each are selected from the group consisting of hydrogen, alkyl having from about one to about eighteen carbon atoms, and cycloalkyl having from about 3-12 carbon atoms;

wherein M is a metal atom selected from the group consisting of alkali metal atoms and alkaline earth metal atoms; and n is the valence of the metal atom M, and ranges from 1 to 2.

2. The thermoplastic composition of claim 1 wherein $M_1$ and $M_2$ are selected from the group consisting of Group I and Group II metal ions.

3. The thermoplastic composition of claim 1 wherein $M_1$ and $M_2$ are selected from the group consisting of sodium, potassium, calcium, lithium, rubidium, barium, magnesium, and strontium, silver, zinc, aluminum.

4. The thermoplastic composition of claim 3 wherein $M_1$ and $M_2$ are each sodium ions or $M_1$ and $M_2$ are together a calcium ion.

5. The thermoplastic composition of claim 1 wherein R of Formula (II) is an alkylidene group conforming to the structure below and said $R_1$ and $R_2$ are both alkyl.

6. The thermoplastic composition of claim 1 wherein R of Formula (II) is thio sulfur (—S—) and $R_1$ and $R_2$ are both alkyl.

7. The thermoplastic composition of claim 1 wherein R of Formula (II) is a carbon-to-carbon bond and $R_1$ and $R_2$ are both alkyl.

8. The thermoplastic composition of claim 1 wherein R of Formula (II) is cycloalkylidene and $R_1$ and $R_2$ are both alkyl.

9. The thermoplastic composition of claim 1 wherein $R_1$ and $R_2$ of Formula (II) are each t-alkyl and R of Formula (II) is an alkylidene group.

10. The thermoplastic composition of claim 1 wherein R of Formula (II) is a carbon-to-carbon bond.

11. The thermoplastic composition of claim 1 wherein R of Formula (II) is thio sulfur (—S—).

12. The thermoplastic composition of claim 1 wherein R of Formula (II) is an alkylidene group conforming to the structure:

13. The thermoplastic composition of claim 12 wherein $R_3$ and $R_4$ of the alkylidene group are both hydrogen.

14. The thermoplastic composition of claim 12 wherein $R_3$ of the alkylidene group is hydrogen and $R_4$ of the alkylidene group is alkyl.

15. The thermoplastic composition of claim 12 wherein $R_3$ of the alkylidene group is hydrogen and $R_4$ of the alkylidene group is cycloalkyl.

16. The thermoplastic composition of claim 12 wherein $R_3$ and $R_4$ of the alkylidene group together form a cycloalkylidene.

17. The thermoplastic composition of claim 12 wherein M of Formula (II) is an alkali metal.

18. The thermoplastic composition of claim 12 wherein M of Formula (II) is an alkaline earth metal.

19. The thermoplastic composition of claim 12 wherein M of Formula (II) is a polyvalent metal.

20. The thermoplastic composition of claim 12 wherein $R_1$ and $R_2$ of Formula (II) are each tertiary alkyl.

21. The thermoplastic composition of claim 12 wherein $R_1$ of Formula (II) is hydrogen and $R_2$ of Formula (II) is tertiary alkyl.

22. The thermoplastic composition of claim 12 wherein $R_1$ of Formula (II) is hydrogen and $R_2$ of Formula (II) is cycloalkyl.

* * * * *